March 31, 1936.  E. E. WEMP  2,036,004
CLUTCH CONTROL MECHANISM
Filed May 25, 1933  2 Sheets-Sheet 1

INVENTOR.
ERNEST E. WEMP.
BY
Barnes, Kisselle & Laughlin
ATTORNEYS.

March 31, 1936. E. E. WEMP 2,036,004
CLUTCH CONTROL MECHANISM
Filed May 25, 1933  2 Sheets-Sheet 2
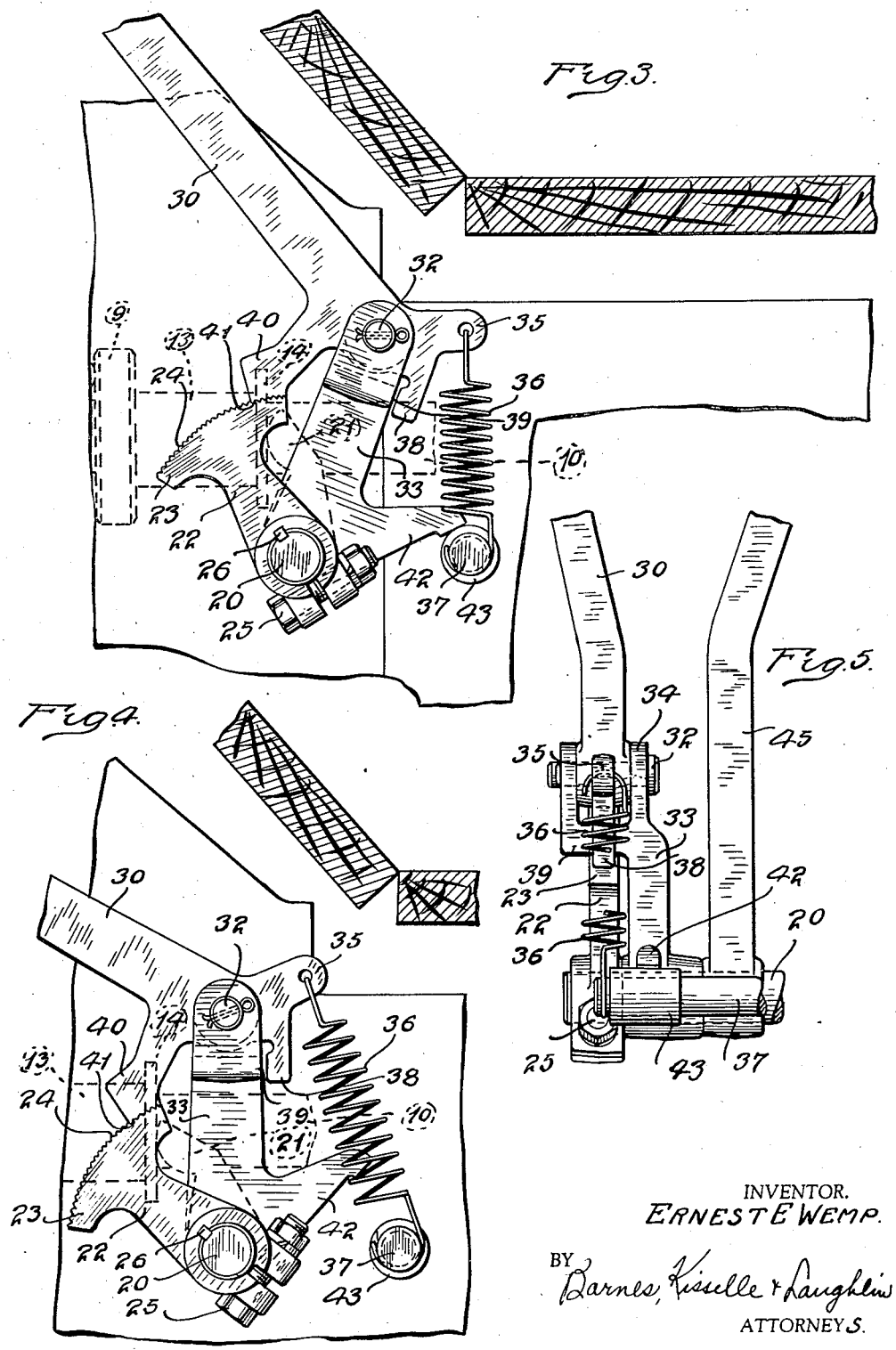
INVENTOR.
ERNEST E WEMP.
BY Barnes, Kisselle & Laughlin
ATTORNEYS.

Patented Mar. 31, 1936

2,036,004

UNITED STATES PATENT OFFICE 2,036,004

CLUTCH CONTROL MECHANISM

Ernest E. Wemp, Detroit, Mich.

Application May 25, 1933, Serial No. 672,795

16 Claims. (Cl. 192—111)

This invention relates to a clutch control mechanism and has to do particularly with a mechanism including an element such as a lever operable to control the clutch in the action of releasing and engaging the same. The invention contemplates an articulating mechanism interconnecting the movable element or lever, and a clutch throw-out member, in such a fashion as to normally permit movements of the clutch throw-out member while the control element or lever remains stationary and at an at-rest position. A similar clutch control mechanism is disclosed and claimed in my Patent No. 1,830,306 of November 3, 1931, and the present invention aims to provide an improved mechanism of this type.

The subject matter of the invention may be used with an ordinary or conventional clutch having facing material which may be subject to wear. It will be appreciated that as the facings wear away that certain of the clutch elements progressively shift in clutch engaged position; this may take place, with the mechanism of the present invention, without interfering with the set-up and the action of the control lever. In other words, there is an automatic compensating action for the usual lash movement of the clutch throw-out lever. The subject matter of the invention may be used in combination with an automatically acting centrifugal clutch such as illustrated in my application Serial No. 672,794, filed May 25, 1933. With such an automatic clutch, the clutch movements may take place, yet the lever may remain stationary, and its relation with the clutch throw-out member may remain substantially constant. Other objects and advantages will become apparent as the detailed description progresses.

Fig. 3 is an enlarged view in side elevation showing one position the parts assume in the operation of the lever.

Fig. 4 is a view similar to Fig. 3 illustrating substantially the position of the parts when the lever is depressed to its extreme position.

Fig. 5 is a view looking at the mechanism from the right to Fig. 3.

Figure 1:
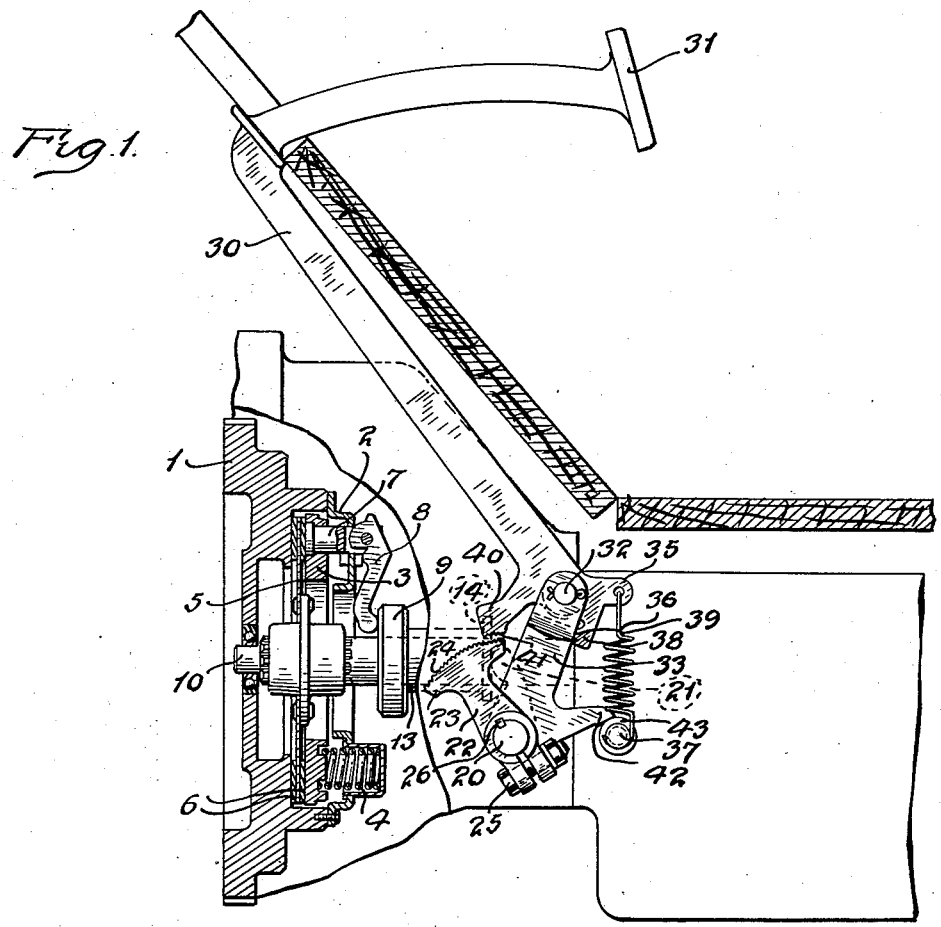
Fig. 1 is a view partly in side elevation and partly in section illustrating the lever and control mechanism operably associated with a clutch.

For the purpose of the present disclosure, a clutch structure is shown which may include a driving element in the form of an engine flywheel 1, a clutch cover plate 2 attached thereto and a pressure ring 3 constituting another clutch driving element. Packing springs 4 are arranged to react against the cover plate and the pressure ring so as to pack a driven disc 5 between the flywheel 1 and pressure ring. The driven disc 5 may have clutch facing material 6, and this material, of course, is subject to wear in use. Studs 7 may have levers 8 connected thereto, and a clutch throw-out member 9 may be arranged to rock the levers 8 to release the clutch, the member 9 being reciprocably mounted upon a driven shaft 10. The clutch throw-out bearing 9 may include a sleeve 13, and this sleeve may have a flange 14. The clutch thus shown is for illustrative purposes only, and is not necessarily of correct proportions as compared to the lever and associated controlling mechanism.

A rock shaft 20 may be provided for the purpose of controlling the clutch, and this rock shaft may have a member or yoke 21 fastened to the rock shaft for the purpose of engaging the flange 14. Also mounted upon the rock shaft is an arm 22 which may have a segmentally shaped portion 23 preferably roughened or serrated as at 24. The hub of this arm surrounds the rock shaft 20 and it may be clamped thereto by a bolt 25, and keyed to the rock shaft by a key 26.

A suitable lever is shown at 30 having a foot pad 31. The lever 30 is pivotally mounted in what may be termed a knee joint 32, to a member 33 which may be rotatably mounted upon the rock shaft 20. The member 33 may be bifurcated, as shown at 34, for this purpose. The lever 30 may be provided with a heel 35 to which a coil spring 36 may be attached, and the other end of the spring may be fixed to a fixed abutment such as a stud 37. The lever 30 may also have a finger 38 positioned so as to contact with the member 33, advantageously, on the portion 39 forming the bight of the U provided by the bifurcated portions. The lever may also have a projecting part 40 preferably roughened or serrated as at 41 and designed to cooperate with the segment or arm 22. The member 33 may have a heel 42 adapted to strike a suitable abutment such as the stud 37 which may be provided with a rubber bumper 43. In Fig. 5 there is shown a portion of a lever 45 also mounted upon the rock shaft 20 and this may be the usual brake control lever of a vehicle.

The spring 36 may hold the lever 30 near the floor boards as shown in Fig. 1. It creates a turning moment clockwise, as Figs. 4 and 5 are viewed, around the knee joint 32, and the finger 38 strikes the portion 39 of the pivoted member 33. Under this condition the lever is rendered rigid with the member 33, and the force of the spring creates a turning moment, in a clockwise direction on the member 33, with the result that its heel 42 stops against the stop member 43. The arrangement is such under these conditions that the member 40 is separated from the arm 22 as shown in Fig. 1, and under this condition, the clutch is engaged. To disengage the clutch, an operator pushes the foot pad 31; the first thing that happens is the breaking of knee joint 32, or in other words, the lever 30 rocks on the joint 32, and the projection 40 moves until its serrated surface contacts and engages the serrated surface of the arm 22. The parts are now in the position substantially as illustrated in Fig. 3. Continued movement of the lever rocks the serrated segment and the member 33 as these parts are, at this time and under this condition, so united as to move as a unit. This obviously rocks the shaft 20 and the yoke pushes the bearing 9 from right to left as Fig. 1 is viewed, thus rocking the levers 9 and retracting the pressure ring 3 to release the clutch. The clutch is engaged by reverse movement and when the lever 30 is entirely released the parts again take the Fig. 1 position.

The arrangement must be such that the turning moment required to break the knee joint by pressure upon the foot pad 31 is less than that required to rock the member 33 against the action of the spring. This is accomplished by proportioning the parts so that the spring, in creating the turning moments on the parts 30 and 33, acts through an effective lever arm on the member 30 which is less in length than the effective lever arm through which the spring acts on the member 33. Moreover some operators have a tendency to rest their foot on the top of the pad on the lever. To meet this, it is preferable that the knee joint be located back of a line connecting the top of the foot pad and the center of the rock shaft 20. Thus, pressure then on the top of the foot pad is translated into a turning moment on the member 33 which tends to hold its heel 42 back against the stop 43. Thus there is no opportunity of such a condition rocking the member 33 and getting the parts out of proper operating relation.

Figure 2:
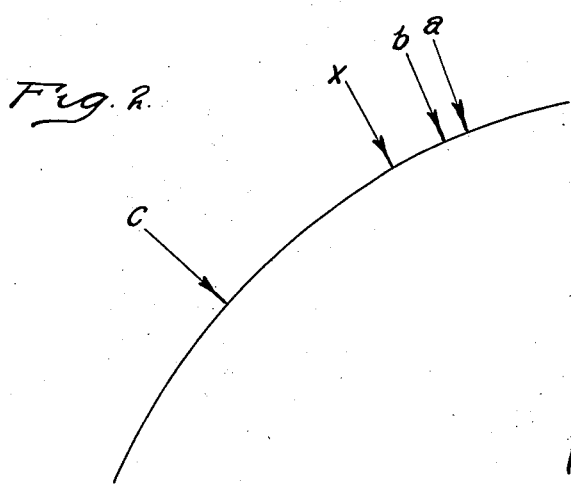
Fig. 2 is a diagrammatic view illustrating the pedal action.

To further describe the operation, refer to the diagrammatic illustration of Fig. 2: Here the point $a$ represents the lever 30 in its at-rest position shown in Fig. 1; the point $b$ represents the point where the projection 40 grips the serrated segment; the point $c$ represents the end of the normal stroke of the lever. Now it will be noted that the distance from $a$ to $b$ represents the lash or ineffective lever movement and that the lever is effective for clutch releasing purposes in the distance represented from $b$ to $c$. This condition will remain constant and will not change. As the clutch facings wear, the pressure ring moves in closer to the flywheel for clutch engagement and, of course, the throw-out levers 8 must rock to shift the bearing 9 back and to permit this the rock shaft 20 must take correspondingly new positions. The result is the serrated segment will creep clockwise, and this it is permitted freely to do without disturbing the pedal 30 in any way. Initially it is preferred that the set up be such that the projection 40 engages with the rear portion of the serrated segment as illustrated in Fig. 3, and after a period of use the segment will creep back with the result that the member 40 will grip the segment somewhat forwardly of where it initially gripped the same. The segment may be made of such size as to take care of all wear normally experienced in the clutch. In the centrifugal clutch referred to above, where there is an automatic engagement and release, the clutch throw-out levers, the throw-out bearing 9, and the segment 22, may shift in various clutch positions, all independently of the clutch throw-out lever. However, any time the clutch is engaged the lever may be depressed and it will always have a constant lash movement from $a$ to $b$ and an effective movement from $b$ to $c$.

To make the illustration a little more clear Fig. 2 shows a point $x$. In an ordinary clutch construction, where the clutch lever is keyed to the rock shaft directly, the initial lash movement of the lever may be from $a$ to $x$, at which point clutch release begins and the effective action of the lever is from $x$ to $c$. As the clutch facings wear, the point $x$ creeps back towards the point $a$ and eventually will coincide or pass the point $a$ at which time the lever, striking the floor boards or other stop, prevents full clutch engagement. This is the cause of much clutch trouble, but need not be further treated herein as it is adequately covered in my patent above mentioned.

I claim:—

1. Mechanism for operating a clutch or the like, comprising a shiftable clutch throw-out member having a serrated surface, a clutch control member provided with a portion having a serrated surface, said serrated surfaces being separated in normal clutch engaged position, means mounting the control member for movement relative to the clutch throw-out member whereby movement of the control member brings the two serrated surfaces into interlocking position, said means including an element upon which the control member is mounted and with respect to which the throw-out member is movable, and which is arranged to move upon the interengaging of the serrated surfaces whereby the throw-out member and the means upon which the lever is mounted shift as a unit.

2. Mechanism for operating a clutch or the like, comprising a shiftable clutch throw-out member having a serrated surface, a shiftable control member having a portion with a serrated surface, said serrated surfaces being normally separated, said control member being shiftable relative to the throw-out member to bring the serrated surfaces into contact with a movement of serrated surface of the control member substantially at right angles to the movement of the serrated surface of the throw-out member when the same shifts and then being shiftable with the throw-out member whereby to move the same and control the clutch.

3. Mechanism for operating a clutch or the like, comprising a clutch throw-out member having a surface adapted to be engaged, said member being mounted on an axis to rock thereon, a second member pivotally mounted on the same axis for pivotal movement relative to throw-out member, a clutch controlling member pivotally mounted upon the second mentioned member eccentrically of the first mentioned axis, and means on the clutch control lever having a surface adapted to be brought into engagement with the surface of the clutch throw-out member upon pivotal movement of the controlling member.

4. Mechanism for operating a clutch or the like, comprising a clutch throw-out member rockable on an axis and operatively associated with a clutch or the like, a member freely pivoted on said axis, a controlling lever pivoted to the member on a knee joint arranged to permit the lever and member to pivot relative to each other in one direction and constraining them against pivotal movement in opposite direction, a spring acting upon the lever tending to hold the knee joint against bending and exerting a turning moment on the lever and member as a single unit around an axis of the member, a stop against which the member abuts, means on the lever normally separated from the clutch throw-out member and arranged to come into engagement with the clutch throw-out member as the lever is pivoted on the knee joint against the action of the spring, said lever and member being movable as a unit around the axis of the member when said means engages the throw-out member whereby to move the throw-out member.

5. Mechanism for controlling a clutch or the like, comprising a rockable actuating member, a second member freely pivoted on the rocking axis of the first mentioned member, a lever, a knee-type joint between the lever and the second mentioned member, a spring acting upon the lever tending to hold the knee-type joint against bending and creating a turning moment on the lever and second mentioned member as a unit, a stop for the lever and second mentioned member as a unit, said lever and first mentioned member having cooperating parts normally spaced from each other and adapted to be brought together upon movement of the lever at the knee joint against the action of the spring whereby the first mentioned member may be moved by movement of the lever.

6. Mechanism for controlling a clutch or the like, comprising a rockable actuating member, a second member freely pivoted on the rocking axis of the first mentioned member, a lever, a knee-type joint between the lever and the second mentioned member, a spring acting upon the lever tending to hold the knee-type joint against bending and creating a turning moment on the lever and second mentioned member as a unit, a stop for the lever and second mentioned member as a unit, said lever and first mentioned member having cooperating parts normally spaced from each other and adapted to be brought together upon movement of the lever at the knee joint against the action of the spring whereby the first mentioned member may be moved by movement of the lever, said cooperating parts on the first mentioned lever having serrated surfaces adapted to engage and lock with each other.

7. Mechanism for operating a clutch or the like, comprising an operating member keyed to a rock shaft, a second member freely pivoted on the rock shaft, a lever connected to the second member by a knee-type joint, a spring acting upon the lever tending to hold the joint against bending and creating a turning moment on the lever and second member as a unit, stops means for the lever and second member, means on the lever adapted to engage and effect shifting of the operating member by a shift of the lever, said means being normally separated from the operating member by action of the spring, said knee-joint bending by pressure applied to the lever to bring the means on the lever into engagement with the operating member, and said lever, operating member, and second mentioned member being shiftable as a unit against the action of the spring to rock the shaft upon further pressure applied to the lever.

8. Mechanism for controlling a clutch or the like, comprising an operating member having an engaging surface, said member being mounted to rock upon an axis, a second member rockable upon the axis, a lever connected to the second member by a knee-type joint, a spring acting upon the lever tending to constrain the knee-type joint against bending and creating a turning moment on the lever and second mentioned member as a unit, means on the lever adapted to engage the said surface on the operating member and normally disengaged therefrom by the action of the spring, said knee joint being adapted to bend upon pressure being applied to the lever to bring the said means on the lever into engagement with the said surface on the operating member, said parts being arranged so that the turning moment on the second mentioned member by pressure on the lever which is required to bend the knee joint is less than a turning moment in the reverse direction which the spring exerts upon the second mentioned member.

9. Mechanism for controlling a clutch or the like, comprising an operating member having an engaging surface, said member being mounted to rock upon an axis, a second member rockable upon the axis, a lever connected to the second member by a knee-type joint, a spring acting upon the lever tending to constrain the knee-type joint against bending and creating a turning moment on the lever and second mentioned member as a unit, means on the lever adapted to engage the said surface on the operating member and normally disengaged therefrom by the action of the spring, said knee joint being adapted to bend upon pressure being applied to the lever to bring the said means on the lever into engagement with the said surface on the operating member, said parts being arranged so that the turning moment on the second mentioned member by pressure on the lever which is required to bend the knee joint is less than a turning moment in the reverse direction which the spring exerts upon the second mentioned member, the position of the axis of the second mentioned member and the knee joint and the part of the lever to which pressure is applied being such that substantially any pressure being applied to the lever at such point tends to articulate the knee joint.

10. Mechanism for controlling a clutch or the like, comprising a rockable operating member having a serrated surface, a member rockable on the same axis as the operating member, a lever, a knee-type joint connecting the lever and second mentioned member, and means on the lever having a serrated surface adapted to be brought into engagement with the serrated surface of the operating member when the knee-type joint is bent.

11. Mechanism for controlling a clutch or the like, comprising a rockable operating member having a serrated surface, a member rockable on the same axis as the operating member, a lever, a knee-type joint connecting the lever and second mentioned member, and means on the lever having a serrated surface adapted to be brought into engagement with the serrated surface of the operating member when the knee-type joint is bent, and means normally holding the serrated surfaces separated.

12. Mechanism for controlling a clutch or the like, comprising a rockable operating member having a serrated surface, a member rockable on the same axis as the operating member, a lever, a knee-type joint connecting the lever and second mentioned member, and means on the lever having a serrated surface adapted to be brought into engagement with the serrated surface of the operating member when the knee-type joint is bent, said second mentioned member and lever being shiftable about the axis of the second mentioned member as a unit upon engagement of the serrated surfaces whereby to shift the operating member.

13. Mechanism for operating a clutch or the like, comprising a segment member having a serrated surface keyed to a controlling rock shaft, a second member pivoted to the rock shaft, a lever, a knee-type joint connecting the lever and second member, a projection on the lever having a serrated surface adapted to cooperate with the serrated surface on the segment, a spring acting upon the lever tending to hold the knee joint against bending and creating a turning moment on the lever and second mentioned member as a unit, stop means for the second mentioned member arranged to stop the same against the action of the spring, the means with the serrated surface on the lever being normally spaced from the serrated surface on the segment and adapted to engage the same upon bending of the knee joint by pressure applied to the lever.

14. In combination, a clutch having driving and driven members, a rockable clutch throw-out member having an engaging surface, a second member pivoted on the same axis with the throw-out member, a control lever, a knee type joint connecting the lever and second member, means on the control lever having an engaging surface, a spring acting upon the lever tending to hold the knee joint against bending and holding the lever and second member as a unit under a turning moment, stop means for the lever and second mentioned member, the means on the lever having an engaging surface being spaced from the engaging surface of the throw-out member when the parts are so held by the spring, said lever being adapted to receive operating pressure and the parts being arranged so that said pressure bends the knee joint to bring the engaging surfaces into engagement whereby upon further movement of the lever under pressure the lever and second mentioned member move as a unit about the axis of the second mentioned member against the action of the spring, and through the means of the engaging surfaces, rock the throw-out member.

15. In combination, a clutch having driving and driven members, a rockable clutch throw-out member having a serrated surface, a second member pivoted on the same axis with the throw-out member, a control lever, a knee-type joint connecting the lever and second member, means on the control lever having a serrated surface, a spring acting upon the lever tending to hold the knee joint against bending and holding the lever and second member as a unit under a turning moment, stop means for the lever and second mentioned member, the means on the lever having a serrated surface being spaced from the serrated surface of the throw-out member when the parts are so held by the spring, said lever being adapted to receive operating pressure and the parts being arranged so that said pressure bends the knee joint to bring the serrated surfaces into engagement whereby upon further movement of the lever under pressure the lever and second mentioned member move as a unit about the axis of the second mentioned member against the action of the spring, and through the means of the serrated surfaces, rock the throw-out member.

16. Mechanism for operating a clutch or the like, comprising a rockable clutch throw-out member having an engaging surface, a control lever positioned on an axis eccentric of the axis of the rockable throw-out member, said lever having an engaging surface which moves in a path which intersects the said engaging surface on the rockable throw-out member whereby movement of the lever on its axis brings the said surfaces into engagement, and means interconnecting the two axes whereby movement of the lever after the engagement of the surfaces is around the axis of the rockable throw-out member so that the throw-out member is rocked upon its axis by the lever, said surfaces being serrated and one of said surfaces being substantially on an arc around the center upon which the throw-out member rocks.

ERNEST E. WEMP.